July 6, 1965     H. S. VAN BUREN, JR     3,193,613
COMBINATION CONDUIT AND WALL CONNECTOR DEVICE FOR THE CONDUIT
Filed May 8, 1963
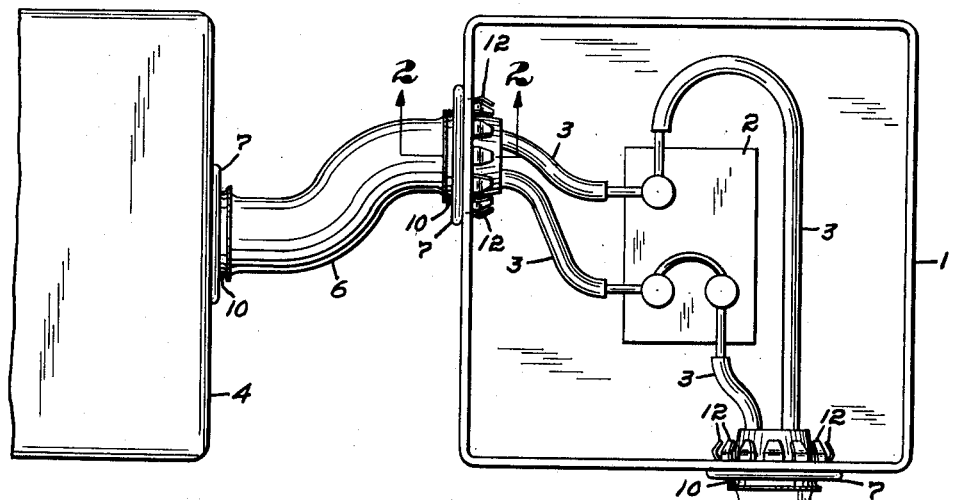
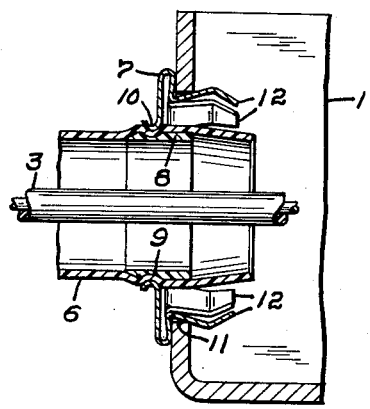
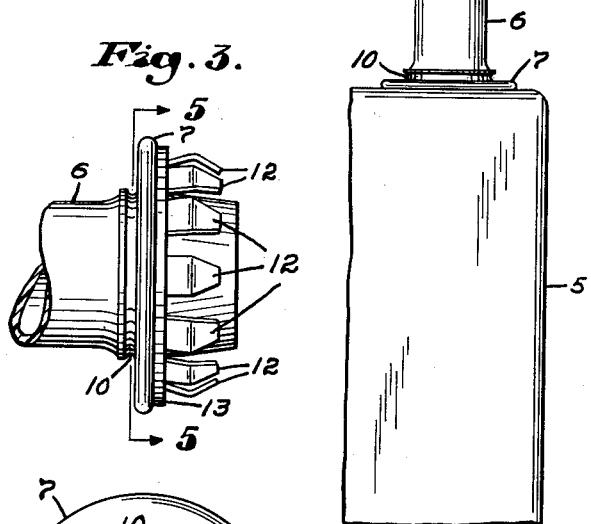
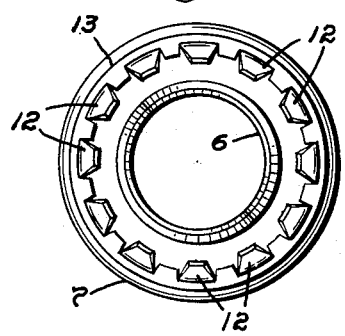
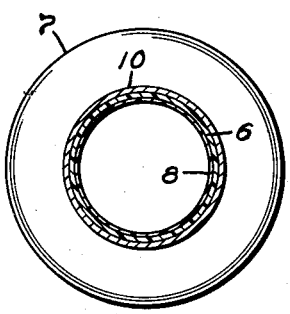
Inventor:
Harold S. van Buren Jr.,
by Walter S. Jones
Atty.

United States Patent Office 3,193,613
Patented July 6, 1965

3,193,613
COMBINATION CONDUIT AND WALL CONNECTOR DEVICE FOR THE CONDUIT
Harold S. van Buren, Jr., Cambridge, Mass., assignor to United-Carr Incorporated, a corporation of Delaware
Filed May 8, 1963, Ser. No. 278,855
2 Claims. (Cl. 174—65)

This invention relates to a combination conduit and connector device which may be used as a carrier and/or protecting means for electrical wires such as may be necessary in electrically connecting various devices where wiring may be protected. The construction may also be used when it is desired to use a conduit for carrying air, water, and other liquids.

An object of the invention is to provide a simple, efficient construction which includes a unit having an aperture through which electrical circuit wires are to be passed (preferably loosely) to connect with components in the unit and a flexible conduit connected to the unit at the aperture by a fastening device attached to the conduit and engaged with the unit at the aperture.

A further object of the invention is to provide a conduit, connector and unit wherein the conduit and connector are of novel construction as compared to the well-known connections using metal-clad or plastic enclosed wires now in use.

In the drawings:

FIG. 1 is a view showing three units connected together by the combination conduit and connector devices of one specific form of the invention; the cover being removed from one of the units;

FIG. 2 is an enlarged section taken on the line 2—2 of FIG. 1;

FIG. 3 is a side elevation of one end of a conduit showing a specific plug button fastener attached thereto;

FIG. 4 is a view of FIG. 3 taken from the right-hand side thereof; and

FIG. 5 is a section taken on the line 5—5 of FIG. 3.

Heretofore, wiring for various electrical units has been connected from the outside by metal or plastic or rubber-clad cables connected to the units by special metal clamps that were attached at apertures in the units usually by threaded constructions.

The present invention relates to the wiring of a unit or units where it is necessary to protect the wiring outside the unit or units and at the same time permit relatively sharp bends in the wiring and also free passage of the wire or wires through a flexible insulating hollow conductor attached to the unit by a novel fastening means.

While the construction of the connecting means for joining the conduit to the unit may take various forms, and be formed of various materials and joined to the conduit in various ways, there is illustrated in the drawings one form of the construction that is simple, inexpensive, easy to operate and easy to assemble.

Also illustrated in the drawings, in FIG. 1, are a combination of elements of the invention which includes a box-like control unit 1 that represents any suitable electrical device containing one or more controls or connecting boards 2 to be electrically wired by ordinary wiring methods including the wires 3 in conjunction with a unit 4 alone, or a second unit 5, and/or other units as desired.

The units 4 and 5 may be such devices as air conditioners, computers, heaters, or any other electrically operated units or any other suitable units when the units of the invention are used to conduct air or liquids.

The invention, as illustrated, includes a conduit 6 of extruded plastic flexible tubing to one end of which is attached a snap fastener type plug button 7 by the use of a jamming plug 8 of plastic material in the form of a tube, and having an annular groove 9. The plug 8 is of such dimensions that when it is forced into the tubing, the tubing will be expanded around a smooth flange 10 surrounding an aperture in the plug button 7 and the material of the conduit 6 will be forced into the groove 9 so that the plug button 7 and flexible conduit 6 are completely strongly interlocked, as will be seen in FIG. 2.

The plug button 7 has a yieldable means to snap through an aperture 11 in the units 1, 4, or 5 and this yieldable means is shown in the form of a plurality of fingers 12 which are shaped in such a manner that the plug button together with the assembled conduit 6 may be snapped through the hole 11 and held strongly in place. It will be obvious that the fastener could be so shaped that the yieldable fingers could have sharp shoulders for positive interlocking engagement with the unit 1.

Either before or after the units 1, 4, or 5 are connected by the conduit 6 with fastening means on each end thereof, as shown in FIG. 1, it is easy to push suitable wires through the conduits and connect them within the units. By using flexible conduits 6 they may be easily bent, as shown between the units 1 and 4, or they may be straight as shown between the units 1 and 5.

A sealing material 13, which may be applied directly to the plug button or may be in the form of a sealing washer, may be used as a part of the combination of elements when it is desired to form a leak-proof joint between the plug button and one of the units 1, 4, or 5. The sealing material 13 will keep moisture from entering into the units around the joint and, more particularly, when the combination of conduit and fastening means is used as a conveyor of air or liquid to provide a leak-proof joint. A sealing means 13 is shown as a part of the assembly shown in FIG. 3.

When the invention is used in connection with electrical wiring of a unit or units it has been found that it is desirable to have a free end of the conduit 6 extend beyond the free ends of the yieldable fingers 12 of the plug button (FIGS. 2 and 3) so that when the wires 3 pass through the conduit and are bent, as shown in FIG. 1, the wires will not contact the ends of the prongs and thus will be protected by the end of the conduit 6 against wear due to vibration. This projection of the end of the conduit 6 beyond the yieldable fingers 12 is particularly important when the plug button 7 is made of yieldable spring metal.

While there has been illustrated, in a general way, one use of the invention in connection with electrical units and there have been described above uses of the invention, in connection with nonelectric units; and while one specific construction of fastener and connection thereof with a conduit has been disclosed it should be understood that variations thereof are contemplated, and therefore, the invention is best defined by the following claims.

I claim:
1. A combination conduit and conduit connector device comprising a conduit of flexible insulating material, a fastener member and a tubular plug member, said fastener including a base portion having an outer peripheral wall, an inner wall with a smooth flange defining an aperture in said member and a series of yieldable prongs extending outwardly from said base portion between said inner and outer walls, said inner wall being in flush circumferential engagement with said conduit; said tubular plug having a peripheral groove formed therein, said plug being seated within said conduit with portions of said conduit being captured between said smooth flange of the inner wall of said base portion and said grooved portion of said plug maintaining said conduit and said fastener member in assembly, said yieldable prongs being in spaced relationship with respect to said conduit and snapping into engagement with an apertured support to secure said device thereto.

2. A combination of a conduit having a regular internal surface formed of a flexible insulating material, a fastener member and a tubular plug member, said fastener including a base portion having an outer peripheral wall, an inner wall defining an aperture in said member, a series of yieldable prongs extending outwardly from said base portion between said inner and outer walls and said inner wall having a smooth, regular engagement surface, said tubular plug having a peripheral groove formed on the external surface thereof, said plug seated within said conduit remote from the terminal ends of said conduit, and said smooth engagement surface engaging against the external surface of said conduit, and said smooth surface being seated over said peripheral groove forcing a portion of said conduit into said peripheral groove formed on said plug whereby portions of said conduit are captured between said inner wall of said fastener member and said groove portion of said plug to maintain said conduit and said fastener member in fixed assembly.

References Cited by the Examiner

UNITED STATES PATENTS

| | | |
|---|---|---|
| 2,140,442 | 12/38 | Clark. |
| 2,398,041 | 4/46 | Russell. |
| 2,627,359 | 2/53 | Woodward _____ 248—27 X |
| 2,683,258 | 7/54 | Churchill _____ 339—128 X |
| 3,005,178 | 10/61 | Radack _____ 339—128 |
| 3,114,969 | 12/63 | Roth _____ 285—162 X |

FOREIGN PATENTS

| | | |
|---|---|---|
| 654,500 | 6/51 | Great Britain. |
| 668,354 | 3/52 | Great Britain |
| 955,523 | 1/50 | France. |
| 1,080,628 | 12/54 | France. |

JOHN F. BURNS, *Primary Examiner.*

JOHN P. WILDMAN, LARAMIE E. ASKIN,
*Examiners.*